Nov. 28, 1950 H. A. HOWELL 2,532,100

ELECTROMAGNETIC TRANSDUCER HEAD

Filed May 29, 1947

Inventor
HUGH A. HOWELL.

by The Firm of Charles W. Hills Attys.

Patented Nov. 28, 1950

2,532,100

UNITED STATES PATENT OFFICE 2,532,100

ELECTROMAGNETIC TRANSDUCER HEAD

Hugh A. Howell, Valparaiso, Ind., assignor to The Indiana Steel Products Company, Chicago, Ill., a corporation of Indiana Application May 29, 1947, Serial No. 751,257

6 Claims. (Cl. 179—100.2)

This invention relates to a magnetic recording and reproducing device, and more particularly, to an electromagnetic transducer head for use in conjunction with magnetic recording and reproducing machines.

Magnetic recording and reproducing apparatus are arranged to make a magnetic record on a traveling magnetizable record member and to reproduce a record which has previously been magnetically recorded. The electromagnetic transducer head which changes the electrical impulses of the signal to be recorded into a fluctuating magnetic field, or which changes the fluctuating magnetic field along the record member into a fluctuating electric signal which is amplified and then reproduced as an audible signal, is one of the most important parts of any magnetic recording and reproducing device.

These electromagnetic transducer heads, as usually employed, are high impedance heads for the reason that it has been extremely difficult to work with low impedance heads due to the trouble of providing a coupling transformer suitable for feeding energy to the low impedance heads.

Constructions have been suggested in the past, however, for utilizing a low impedance head, such, for example, as that shown in the Pfleumer Patent No. 2,247,847, granted July 1, 1941.

One of the principal features and objects of the present invention is to provide a novel electromagnetic transducer head.

A further object of the present invention is to provide a novel electromagnetic transducer head in which a small transformer is built directly into the head, so that the assembly as a whole represents a high impedance to the circuit to which it is connected but has the advantages of a low impedance head.

A still further object of the present invention is to provide an electromagnetic transducer head of novel construction and a novel method and means for feeding energy to an electromagnetic transducer head.

Another and still further object of the present invention is to provide a novel method and means for recording signals on a traveling magnetizable record member and for reproducing signals previously recorded thereon.

The novel features which I believe to be characteristic of my invention are set forth with particularity in the appended claims. My invention itself, however, both as to its organization, manner of construction and method of operation, together with further objects and advantages may best be understood by reference to the following description taken in connection with the accompanying drawings, in which:

Figure 1:
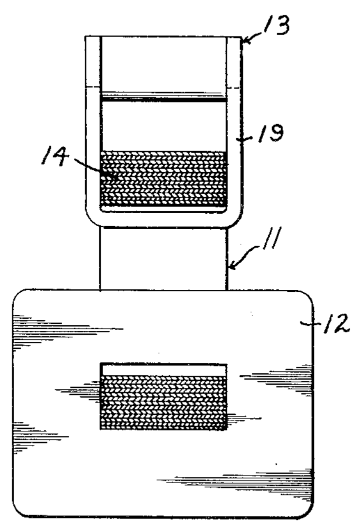
Figure 1 is an elevational view partly in section of an electromagnetic transducer head embodying the novel teachings and principles of the present invention.

In the various figures of the drawings, an electromagnetic transducer head 10 is illustrated which includes a small transformer 11 having a relatively high impedance winding 12 and a very low impedance single-turn winding 13. The core 14 of the transformer 11 is laminated in a direction transverse to the plane of its closed magnetic path, and this may be conveniently done by spirally winding a ribbon of soft iron or other suitable paramagnetic material having high permeability but low magnetic retentivity.

One of the particular features of the present invention is the manner of constructing the magnetic poles which define the operating gap of the electromagnetic transducer head.

As is clearly shown in the various figures of the drawings, a pair of magnetic pole portions 15 and 16 are provided by forming a U-shape member 17 around a copper bar 18. For a reason which will presently be pointed out, the copper bar 18 is preferably of rectangular cross-section, while the flat strip 17 is wrapped tightly around three sides of the copper bar 18. The width of the copper bar is determined by the desired length of the gap $w$ between the poles 15 and 16.

In practice, it has been found that this gap should preferably be between .0005 and .001 inch in order to obtain the best results. It has further been found that the thickness $t$ of the magnetic yoke 17 should be approximately equal to the thickness $w$ of the copper bar 18; and for the best results should not be more than three times the thickness $w$ of the copper bar 18.

The secondary winding 13 of the transformer 11 is made up of the copper bar 18, and a U-shape member 19 which is formed of conducting material and whose ends abut the ends of the bar 18 to form a closed conducting loop. The ends of the bar 18 may be conveniently secured to the ends of the U-shape member 19 by soldering or the like. It will be noted that the U-shaped member 19 extends through the coiled core piece 14 of the transformer 11, as is clearly shown in Figures 1 and 2 of the drawings.

The cross-sectional area of the bar 18 will depend upon the amount of current which it will be necessary for the bar 18 to carry without unduly over heating. It has been found that the best results are obtained when the height of the bar 18 is kept as small as possible so as to keep the length of the magnetic circuit formed by the U-shape magnetic piece 17 as short as possible.

The cross-sectional area of the magnetic material of the yoke 17 should be preferably just large enough to handle the flux produced around the conductor 18 by current flowing through the conductor.

As hereinbefore pointed out, the cross-section of the conductor bar 18 is preferably rectangular, and the reason for this is that when a conductor of circular or elliptical cross-section is used, it becomes very difficult to control the spacing of the gap between the poles 15 and 16 for it must be remembered that this gap is extremely small.

Figure 2:
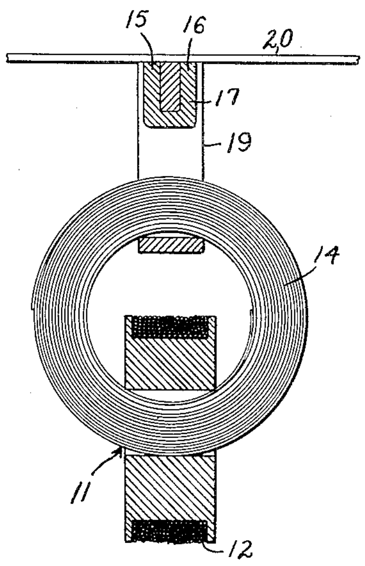
Figure 2 is an end view of the electromagnetic transducer head shown in Figure 1, and in addition has a portion of a traveling record member shown as passing thereover.
Figure 3:
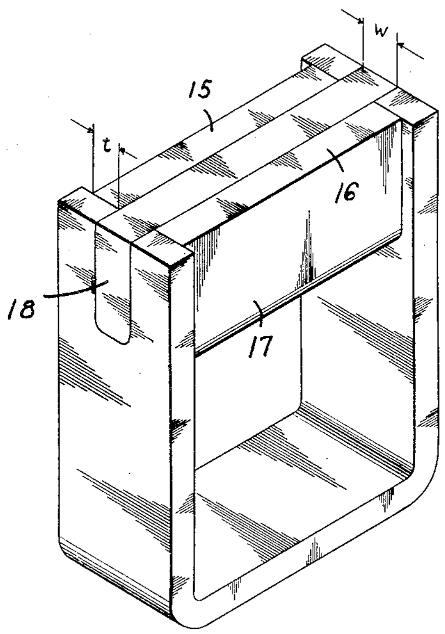
Figure 3 is an isometric view of a portion of the head assembly shown in Figures 1 and 2.
Figure 4:
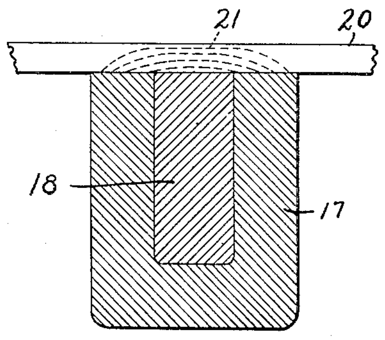
Figure 4 is an enlarged sectional view of the upper portion of the head assembly and a portion of the record member passing thereover, diagrammatically illustrating the flux pattern in the record member.

By constructing a head in the manner shown above, a very fine control of the flux in the magnetic record member 20 is obtained. As shown in Figures 2 and 4 of the drawings, the magnetic record member, which may conveniently be in the form of a paper tape having ferromagnetic material of relatively high coercive force coated thereon, is caused to pass successively across the poles 15 and 16. Since the only portion of flux which is useful in making a recording on the record member 20 is that represented by the fringing flux at the ends of the poles 15 and 16 (as indicated by the broken lines 21), it will be observed that by using a pair of poles of very narrow width which are closely spaced together and directly abut the magnetic record member to make a most effective use of the magnetic field set up by current flowing through the conductor 18 is obtained.

It has further been found in practice that an arrangement of the type hereinbefore described is particularly effective, highly efficient, and gives exceptionally good fidelity when used as a playback unit.

While I have shown a particular embodiment of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. An electromagnetic transducer head comprising a pair of core members and a pair of coils, one of said coils being an input-output coil which is wound on a first one of said core members and the other of said coils being a single-turn coil wound on both of said core members, said second core member being a U-shaped strap snugly straddling a portion of the second one of said coils, the legs of the U lying in substantially parallel planes, closely spaced together and arranged to have a traveling magnetic record member successively pass across the ends thereof in a path substantially perpendicular to the direction of extension of the legs to form with said second core member a substantially closed magnetic path.

2. An electromagnetic transducer head comprising a pair of core members and a pair of coils, one of said coils being an input-output coil which is wound on a first one of said core members and the other of said coils being a single turn coil including a rectangular bar-like portion, said second core member being a U-shape strap snugly straddling and in intimate surface contact with said bar-like portion of said single turn coil, the legs of the U lying in substantially parallel planes and disposed in closely spaced relationship, the ends of the U being substantially flat and lying in a single plane so positioned that a traveling magnetic record member passes over first one and then the other of said ends.

3. An electromangetic transducer head comprising a pair of core members and a pair of coils, one of said coils being an input-output coil which is wound on a first one of said core members and the other of said coils being a single turn coil including a U-shaped conducting member and a straight conducting member closing the ends of the U-shaped conducting member, said second core member being a U-shaped paramagnetic member straddling said straight conducting member, the legs of said U-shaped paramagnetic member terminating in closely spaced relationship to define a magnetizing and play-back gap across which a traveling magnetic record member is arranged to pass, said second core member forming with said record member a substantially closed magnetic path.

4. An electromagnetic transducer head comprising a pair of core members and a pair of coils, one of said coils being an input-output coil which is wound on a first one of said core members and the other of said coils being a single turn coil including a U-shaped conducting member and a conducting bar of rectangular cross-section, said second core member being a plate member wrapped tightly around three sides of said conducting bar and shaped to conform thereto, the ends of said plate member and the fourth side of said conducting bar lying substantially in a single plane arranged to support a traveling magnetic record member.

5. An electromagnetic transducer head comprising a pair of core members and a pair of coils, one of said coils being an input-output coil which is wound on a first one of said core members and the other of said coils being a single turn coil including a conducting bar bent into U-shape and a straight conducting bar of substantially rectangular cross-section closing the ends of the U-shaped conducting bar, said straight conducting bar lying in a plane at right angles to the planes of the legs of said U-shaped conducting bar, said second core member being a paramagnetic strip wrapped closely around the inner edge and two sides of said straight conducting bar, the outer ends of said paramagnetic strip terminating in the plane of the outer edge of said straight conducting bar, thereby to provide a continuous surface therewith for receiving and supporting a traveling magnetic record member.

6. An electromagnetic transducer head comprising a pair of core members and a pair of coils, one of said core members being a tight spirally wound ribbon of paramagnetic material and the second core member being a single strip of paramagnetic material bent into U-shape with closely spaced parallelly disposed leg portions, one of said coils being wound on said first core member and having terminals arranged to be connected to an amplifier, said second coil being a single turn coil including a U-shaped conducting member and a straight conducting member closing the ends of said U-shaped conducting member, said straight conducting member being snugly nested within said U-shaped paramagnetic member between said closely spaced parallelly disposed legs.

HUGH A. HOWELL.

REFERENCES CITED

The following references are of record in the file of this patent:

UNITED STATES PATENTS

| Number | Name | Date |
|---|---|---|
| 1,915,804 | Smith | June 27, 1933 |
| 2,260,398 | Otte | Oct. 28, 1941 |
| 2,351,003 | Camras | June 13, 1944 |
| 2,381,463 | Potter | Aug. 7, 1945 |
| 2,418,542 | Camras | Apr. 8, 1947 |

FOREIGN PATENTS

| Number | Country | Date |
|---|---|---|
| 612,450 | Germany | Apr. 25, 1935 |